Figure 1:
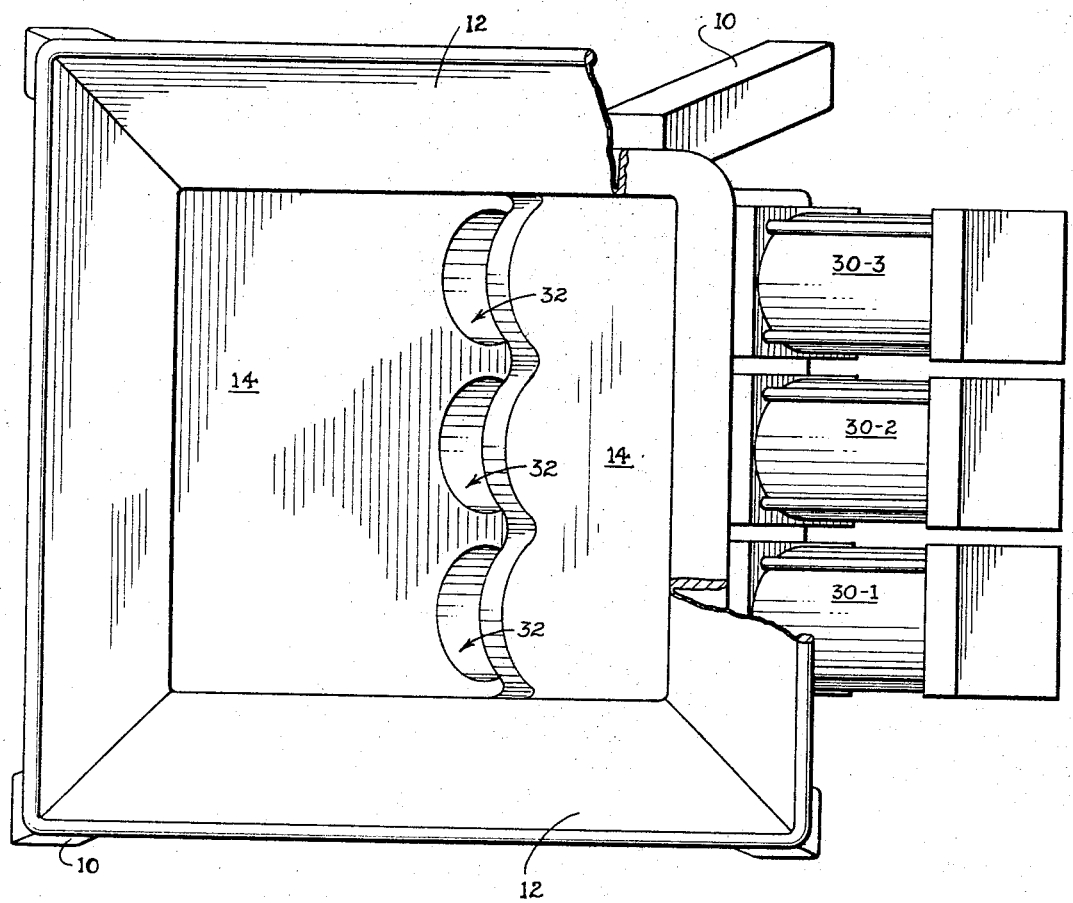

June 27, 1967  R. T. TOWNSEND  3,327,640
PUMP FOR SAUSAGE MIXTURE OR THE LIKE

Filed Jan. 13, 1965  6 Sheets-Sheet 1

Inventor
Ray T. Townsend
by Bair, Freeman & Molinare
Attorneys

June 27, 1967 R. T. TOWNSEND 3,327,640
PUMP FOR SAUSAGE MIXTURE OR THE LIKE
Filed Jan. 13, 1965 6 Sheets-Sheet 2

Inventor
Ray T. Townsend
by Bair, Freeman & Molinare
Attorneys

June 27, 1967  R. T. TOWNSEND  3,327,640
PUMP FOR SAUSAGE MIXTURE OR THE LIKE
Filed Jan. 13, 1965  6 Sheets-Sheet 3
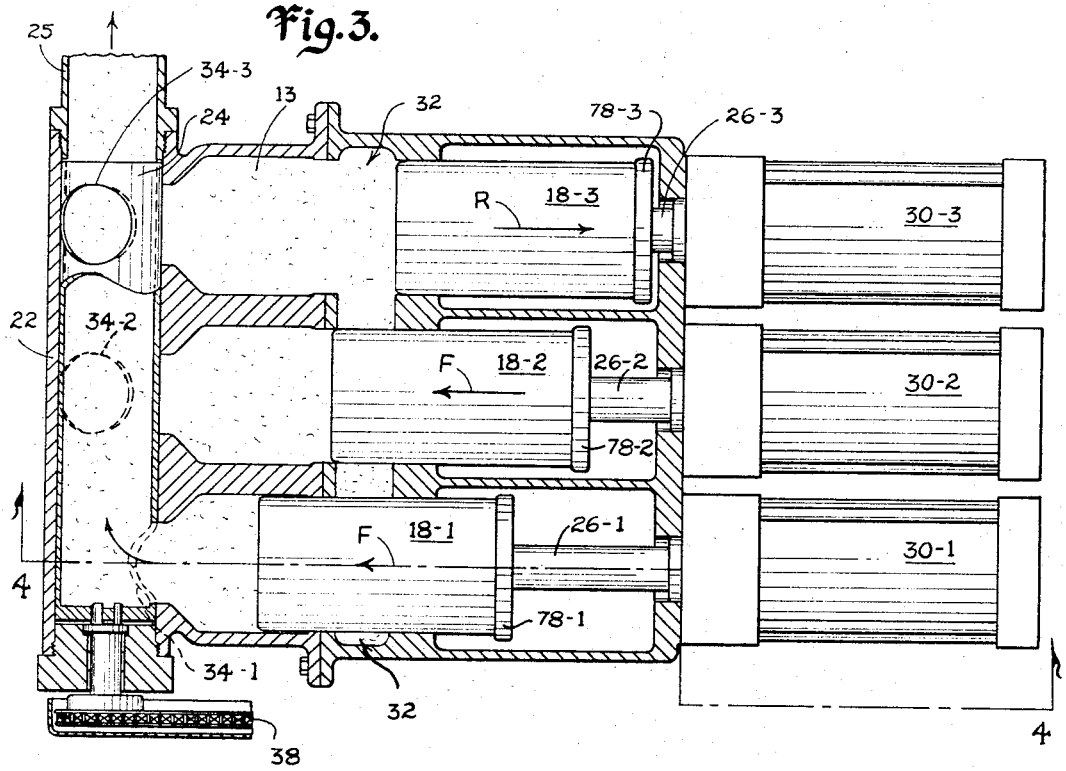
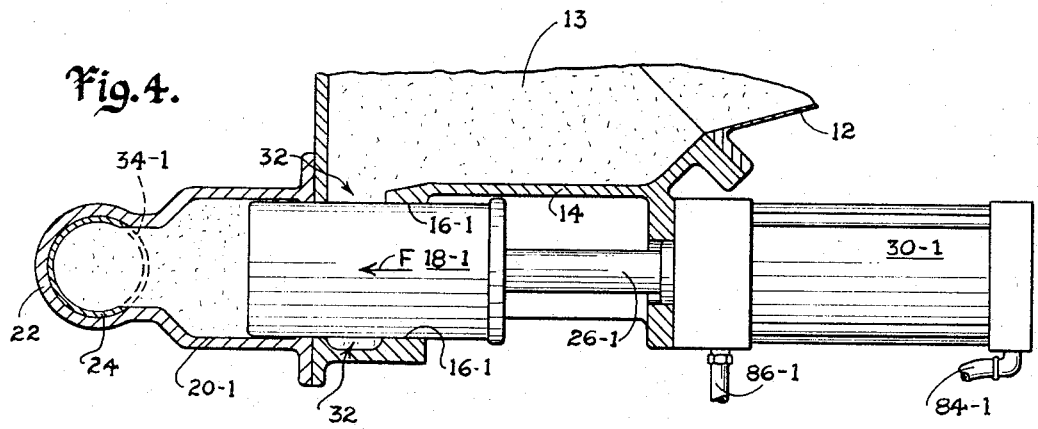
Inventor
Ray T. Townsend
by Bair, Freeman & Molinare
Attorneys

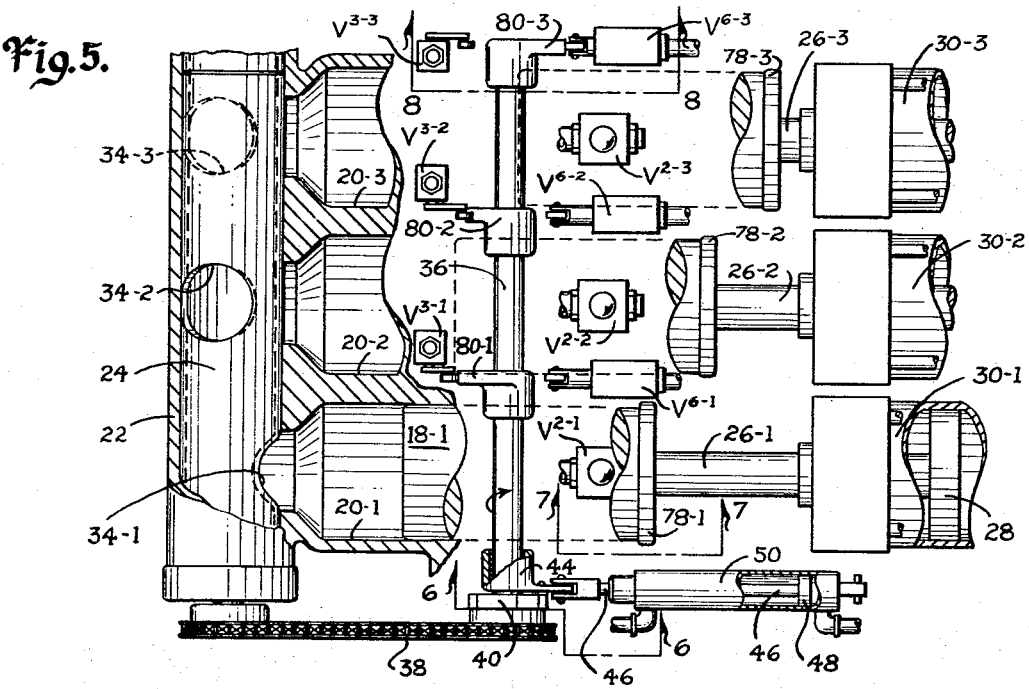
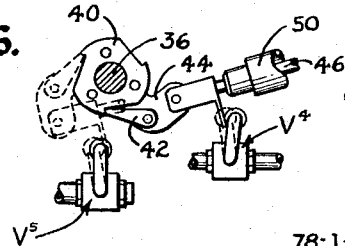
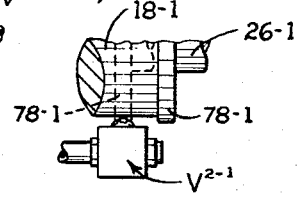
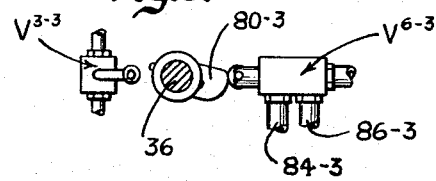

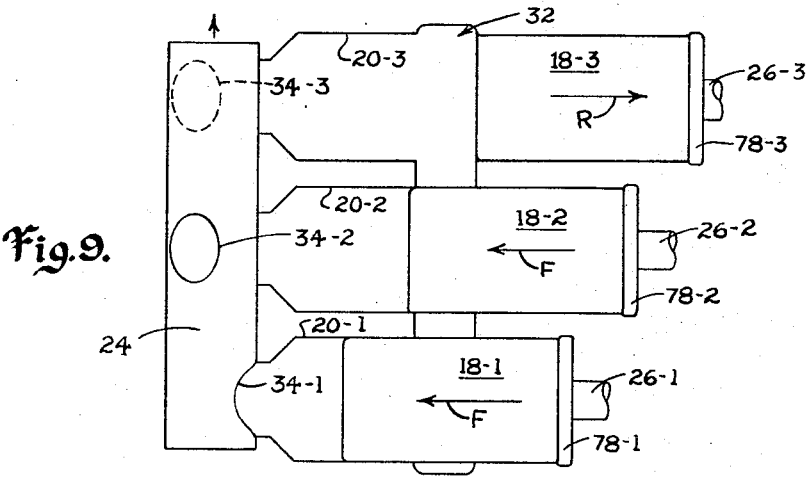
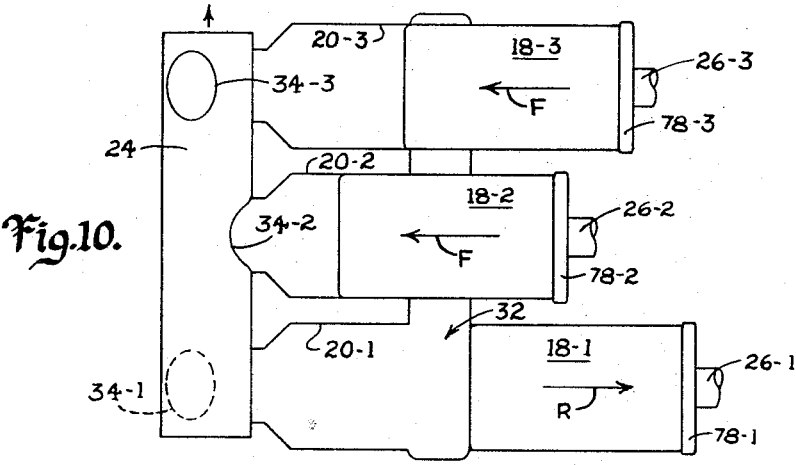
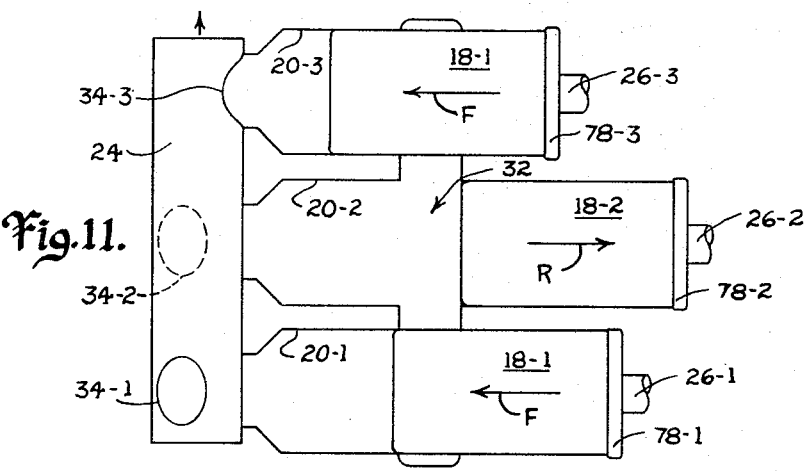

June 27, 1967  R. T. TOWNSEND  3,327,640
PUMP FOR SAUSAGE MIXTURE OR THE LIKE
Filed Jan. 13, 1965  6 Sheets-Sheet 6
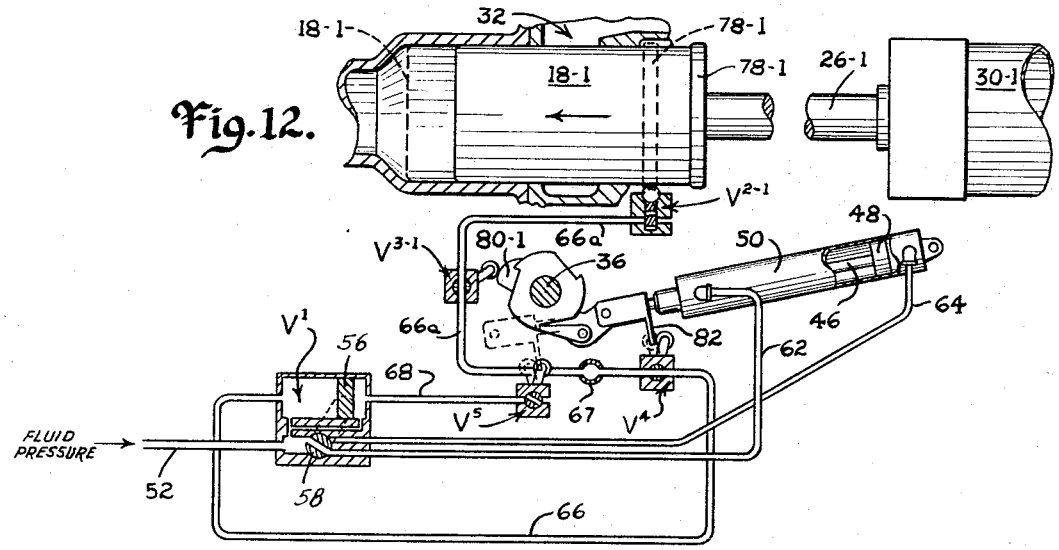
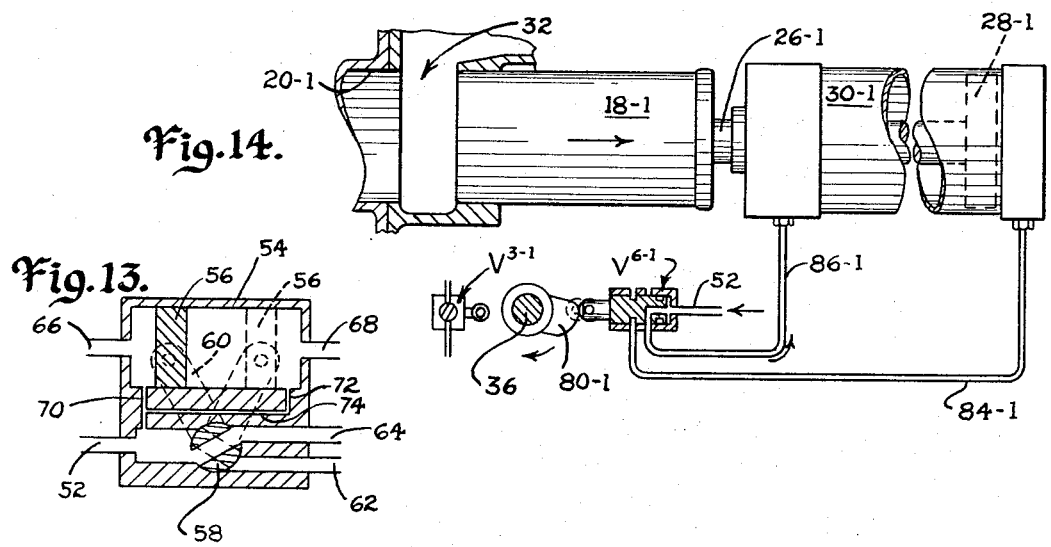
Inventor
Ray T. Townsend
by Bair, Freeman & Molinare
Attorneys United States Patent Office 3,327,640
Patented June 27, 1967

3,327,640
PUMP FOR SAUSAGE MIXTURE OR THE LIKE
Ray T. Townsend, Des Moines, Iowa, assignor to Townsend Engineering Company, Des Moines, Iowa, a corporation of Iowa
Filed Jan. 13, 1965, Ser. No. 425,148
8 Claims. (Cl. 103—169)

This invention relates to a pump for sausage mixtures, weiner mixtures or other plastic products wherein the pump provides a continuous flow of product, moving it in large volume at relatively low pressure so that crushing or similar damage as to meat tissues is minimized.

One object of the invention is to provide a combination of a plurality of cylinders having displacement plungers therein which communicate with a valve, the valve having a porting arrangement that permits overlapping strokes of two plungers to permit displacement of product into the valve while a single plunger is being retracted, the arrangement thereby resulting in a continuous flow of product without pressure variation.

Another object is to provide novel power cylinder arrangements for propelling the plungers, the operation of the power cylinders being quite flexible so that a valving arrangement can be provided to insure movement of two plungers in the displacing direction while one plunger is being retracted so that there will be no interruptions in the continuous flow of product from the pump, thereby eliminating any pulsation or variation in the flow of the product being pumped.

Still another object is to provide pump plungers which are actuated by fluid pressure such as compressed air, and a sequential valving arrangement that indexes a product control valve in accordance with plunger reciprocations, and wherein the sequential operation of valves to control the pump plungers as well as speed of operation of the pump occur automatically and in response to product requirement at the outlet from the pump.

A further object is to provide a pump which runs continuously and automatically when connected to a source of fluid pressure while its speed of operation is dependent upon the requirements of a machine such as a casing stuffer and linker connected to the output of the pump.

Still a further object is to provide a pump wherein there is a minimum of agitation of the mixture by the pump elements, thus avoiding crushing or similar damage to the meat tissues and undesirable "foaming" of the mixture.

Figure 2:
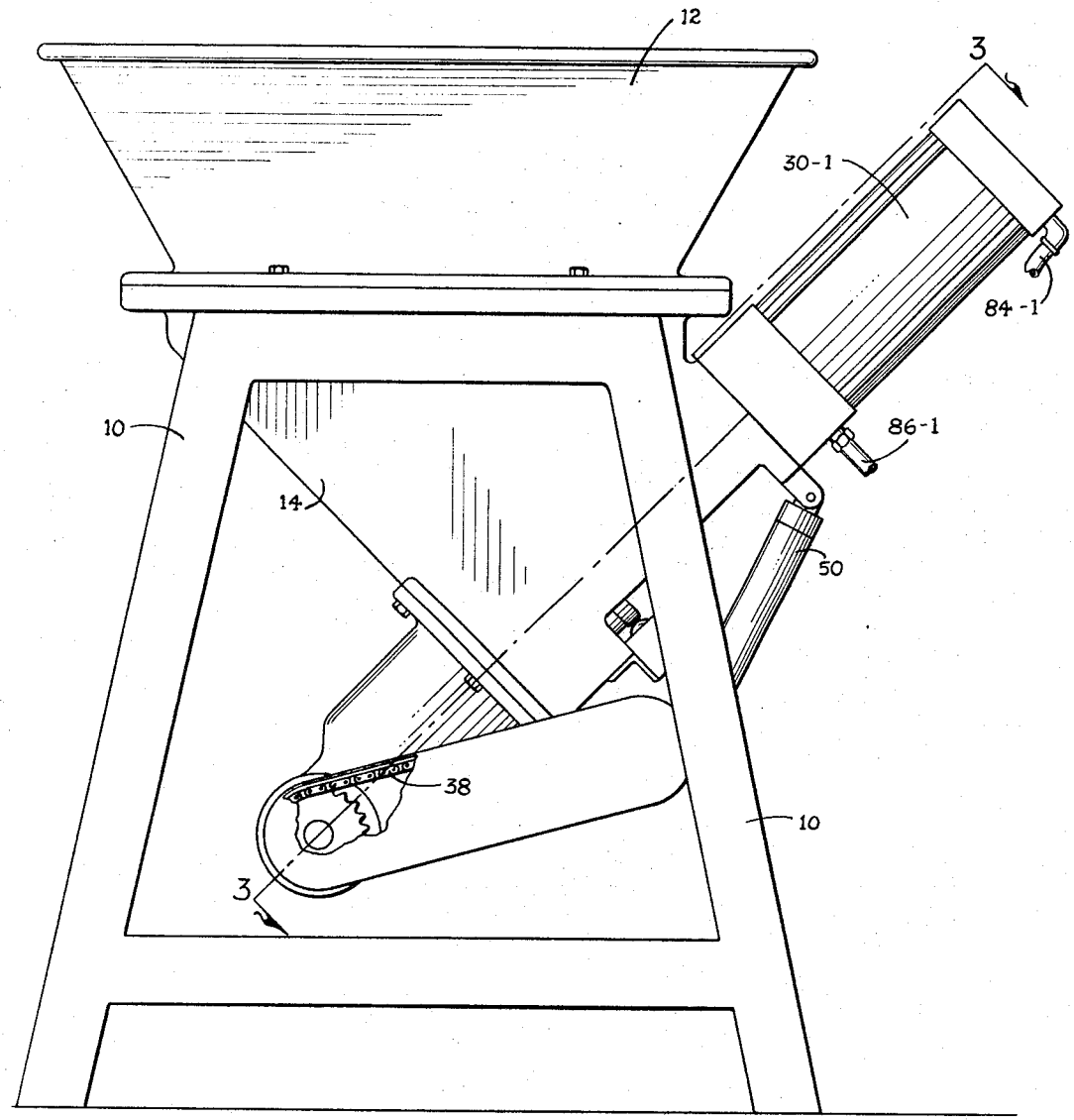

With these and other objects in view, my invention consists in the construction, arrangement and combination of the various parts of my herein disclosed pump, whereby the objects above contemplated are attained, as hereinafter more fully set forth, pointed out in my claims and illustrated in detail on the accompanying drawings, wherein:

FIG. 1 is a plan view of a pump for sausage mixture or the like embodying my invention;
FIG. 2 is a side elevation thereof;
FIG. 3 is a sectional view on the line 3—3 of FIG. 2;
FIG. 4 is a vertical sectional view on the line 4—4 of FIG. 3;
FIG. 5 is a partial sectional view somewhat similar to FIG. 3 with a control valve arrangement and actuating means therefor added;
FIG. 6 is an end elevation of a portion of FIG. 5 and is partially in section on the line 6—6 of FIG. 5;
FIG. 7 is an elevation of one valve of FIG. 5 to show the actuating means therefor, and is in accordance with the indicating line 7—7 of FIG. 5;
FIG. 8 is a sectional view on the line 8—8 of FIG. 5 to show other valves of the pump;
FIGS. 9, 10 and 11 are diagrammatic views somewhat similar to FIG. 3 showing different positions of product plungers during a cycle of operation of the pump;
FIG. 12 is a fluid pressure diagram showing some of the valves and actuating elements of FIG. 5;
FIG. 13 is an enlargement of one valve shown in FIG. 12, and
FIG. 14 is a fluid pressure diagram of other valves of FIG. 5.

On the accompanying drawings I have used the reference numeral 10 to indicate a frame which is in the form of a four-legged support for a product hopper 12. The hopper 12 is adapted to have deposited therein plastic product 13 such as a sausage mixture, a weiner mixture or the like which gravitates into a hopper bottom 14 terminating in three product plunger cylinders 16–1, 16–2 and 16–3 in which product plungers 18–1, 18–2 and 18–3, respectively, are reciprocably mounted. As shown in FIGS. 3 and 4, the plungers extend through the cylinders and into cylinder extensions 20–1, 20–2 and 20–3, respectively. The cylinder extensions terminate in a single rotary valve housing 22 which communicates with all three cylinder extensions. A valve rotor 24 is rotatable in the housing 22 and communicates with an outlet pipe 25 which may extend to the stuffing tube of a sausage stuffing, linking and looping machine such as shown in my Patents Nos. 3,115,-668 and 3,191,222.

Passing up minor details at this time, the general arrangement for operating the product plungers comprises a piston rod 26 for each plunger, each piston rod having a plunger actuating piston 28 thereon as shown in FIGS. 5 and 14 in a power cylinder 30. Accordingly, there are three of the piston rods, three of the plunger actuating pistons, and three of the power cylinders with –1, –2 and –3 designations. The hopper bottom 14 has a product receiving throat 32 extending around all three of the plungers 18–1, 18–2 and 18–3 and located between the three cylinders 16–1, 16–2 and 16–3 and the three cylinder extensions 20–1, 20–2 and 20–3.

The valve rotor 24 is provided with three intake ports 34–1, 34–2 and 34–3 which constitute outlet ports for the cylinder extensions, and each port is 120° in extent as shown in FIG. 4. The ports are located 120° apart for successive alignment with the cylinder extensions 20–1, 20–2 and 20–3 in that order (and repeated as long as the pump is in operation) as will hereinafter appear. During indexing of the valve rotor 24 there is overlapping of the ports for continuous flow of the sausage mixture or other product 13 during the operation of the pump, the purpose of which will hereinafter appear.

Means is provided for indexing the valve rotor 24 in the form of a valve rotor drive shaft 36 operatively connected to the valve rotor by a chain drive 38. For indexing the drive shaft 36, a ratchet wheel 40 is mounted thereon, and a pawl 42 coacts therewith and is pivoted to a pawl lever 44 oscillatable on the shaft 36. A piston rod 46 is operatively connected to the pawl 44 and extends from an indexing piston 48 reciprocable in a cylinder 50.

Referring to FIGS. 5, 6, 7, 8, 12, 13 and 14, a plurality of fluid pressure valves and a fluid pressure system therefor are illustrated wherein a bleed actuated valve $V^1$ is supplied with fluid pressure such as compressed air from a fluid pressure supply line 52. The fluid pressure system includes:

(1) Three bleed valves $V^{2-1}$, $V^{2-2}$ and $V^{2-3}$ actuated by actuator rings 78–1, 78–2 and 78–3 of the three product plungers 18–1, 18–2 and 18–3,
(2) Three cammed valves $V^{3-1}$, $V^{3-2}$ and $V^{3-3}$,
(3) One pawl retraction valve $V^4$,
(4) One bleed valve $V^5$, and
(5) Three power cylinder valves $V^{6-1}$, $V^{6-2}$ and $V^{6-3}$.

The valve $V^{3-1}$ is actuated by a cam 80–1 on the shaft 36 and likewise the valves $V^{3-2}$ and $V^{3-3}$ are actuated by cams 80–2 and 80–3, respectively. The pawl retraction valve $V^4$ and the bleed valve $V^5$ are actuated by a valve actuating blade 82 carried by the piston rod 46. The lower cylinder valves $V^{6-1}$, $V^{6-2}$ and $V^{6-3}$ are also actuated by the cams 80–1, 80–2 and 80–3, respectively, in different position thereof (for the valve $V^{6-1}$ as shown in FIG. 14 when compared with the position of the cam 80–1 for actuating the valve $V^{3-1}$ as shown in FIG. 12).

The valve $V^1$ has therein a cylinder 54 in which a piston 56 is reciprocable in response to fluid pressure from the line 52 passing through restricted passageways 70, 72 and 74 as will hereinafter appear as opposed to the exhaust of fluid pressure through the bleed lines 66 and 68 leading to the bleed valves $V^{2-1}$, $V^{2-2}$ and $V^{2-3}$, and $V^5$, respectively. The valve $V^1$ also includes an oscillatable valve plug 58 having a valve lever 60 for oscillating the same, the valve lever being operatively connected to the piston 56 for actuation thereby. A pawl retraction line 62 and a pawl advance line 64 connect the valve $V^1$ (specifically two outlets from its valve plug 58) with opposite ends of the cylinder 50 as shown in FIG. 12.

The pawl retraction valve $V^4$ is located in the bleed line 66 to the valves $V^{2-1}$, $V^{2-2}$ and $V^{2-3}$, the latter valves each having a bleed line 66ª connected to a manifold 67 which in turn is connected to the bleed line 66 so that all three of the $V^2$ valves and likewise all three of the $V^3$ valves communicate with the bleed line 66. The power cylinder valves $V^{6-1}$, $V^{6-2}$ and $V^{6-3}$ are connected by means of pump lines 84–1, 84–2 and 84–3 and retract lines 86–1, 86–2 and 86–3 to opposite ends of the power cylinders 30–1, 30–2 and 30–3.

*Practical operation*

In the operation of my product pump, a continuous flow of product is achieved by means of the three plungers 18–1, 18–2 and 18–3 advancing alternately in the 1, 2, 3 order named. A large volume of product at relatively low pressure is thereby pumped in addition to continuous flow at a constant pressure. The constant pressure may be regulated by regulating the pressure of the compressed air supplied to the line 52, and adjusted so that the plungers do not crush or damage the meat tissues as in many other types of meat pumps.

The movement of the three plungers 18–1, 18–2 and 18–3 occurs as follows:

(1) FIGS. 4 and 9 show the port 34–1 wide open at which time—

(A) Plunger 18–1 is delivering product through port 34–1 as in FIGS. 3 and 4, "F" in FIG. 3 indicating forward.

(B) Ports 34–2 and 34–3 are closed.

(C) Plunger 18–2 has moved up to its cylinder extension 20–2 and is exerting pressure on the product (also R) but can move no farther because of the port 34–2 being closed.

(D) Plunger 18–3 is in a retracting condition (R).

(2) When plunger 18–1 nears the end of its delivery stroke the following events occur:

(A) Indexing piston 48 starts to rotate the cam shaft 5 and valve rotor 24 clockwise.

(B) After 15° of valve rotation and for the next 90° of valve rotation the open ports 34–1 and 34–2 are overlapped.

(C) Plunger 18–2 effects its delivery stroke (FIG. 10).

(3) When indexing piston 48 reaches the forward end of its stroke—

(A) Port 34–1 is closed.

(B) Plunger 18–1 begins to retract.

(C) Plunger 18–3 moves up to its cylinder extension 20–3 and is exerting pressure on the product.

(4) The foregoing sequence of events progresses through the stage shown in FIG. 11 and starts repeating again as in FIGS. 3 and 9.

The sizes of the pump lines 84–1, 84–2 and 84–3 and the retract lines 86–1, 86–2 and 86–3, as well as the porting in the valves $V^{6-1}$, $V^{6-2}$ and $V^{6-3}$ are such that the retracting strokes of the product plungers 18–1, 18–2 and 18–3 are of relatively shorter time duration than the forward strokes. By reason of the retracting strokes producing voids in the cylinder extensions 20–1, 20–2 and 20–3 when the forward ends of the plungers are withdrawn into the product receiving throat 32, the product 13 quickly rushes in to fill the voids and the plungers are ready for their next forward strokes. This type of cylinder filling operation overcomes bridging of the product in the hopper because of the voids referred to acting as a vacuum to permit atmospheric pressure on the product to force it into the cylinders. When the product is coarse-ground meat for example, air pockets occur in the meat which tend to cause the meat to bridge in the hopper if gravity alone is depended on to feed the meat from a hopper to a pump as heretofore done. With my pump producing the voids referred to I have found the bridging problem solved.

Near the end of the forward stroke of the plunger 18–1 as shown in FIG. 12 by dotted lines, the actuator ring 78 will contact a ball 79 of the bleed valve $V^{2-1}$ to bleed the line 66, the valves $V^{3-1}$ and $V^4$ being open at this time as shown. Since there is a continuous supply of air from the line 52 through the passageways 70, 74 and 72 to the right-hand side of the piston 56, it will move towards the left to the position shown in FIG. 13 and reverse the plug 58. Thereupon the compressed air will flow through the line 64 to the right-hand end of the cylinder 50 for advancing the pawl 42 and thereby indexing the ratchet wheel 40 and the valve rotor drive shaft 36 through an arc of 120° as to the dotted line position shown in FIG. 6. This will close the pawl retraction valve $V^4$ and the cammed valve $V^{3-1}$, and at the end of the stroke as shown by dash lines in FIG. 12 will open the bleed valve $V^5$ so that the piston 56 of the bleed actuated valve $V^1$ will travel toward the right from the position shown in FIG. 13 to the position shown in FIG. 12 for returning the piston 48 in the cylinder 50 whereupon it is ready for the next operating cycle. As soon as the cam 80–1 leaves the valve $V^{6-1}$ in FIG. 14 the pressure of air in the line 52 will push the plunger of the valve toward the left for reversing the stroke in the power cylinder 30–1 and the plunger 18–1 will move forward at a properly sequenced time in the rotation of the shaft 36. The valve plug 58 may be arranged to bleed the line 62 during this operation or the line may have a bleed vent in it in accordance with usual practice.

Referring to FIG. 12 the valving sequence is such that the ratchet and pawl index mechanism is actuated in the ratchet rotating direction by the successive completions of the forward strokes of the plungers 18–1, 18–2 and 18–3 opening the $V^2$ valves in succession. The valves $V^{3-1}$ and $V^4$ are in position such that when $V^{2-1}$ is opened the ratchet wheel will be rotated. The blade 82 leaves the valve $V^4$ so that it closes and the cam 80–1 leaves the valve $V^{3-1}$ so that it closes and therefore opening of the bleed valve $V^{2-1}$ when the plunger 18–1 is retracted does not bleed the line 66–66ª until the end of the next forward stroke of the plunger. As soon as the forward stroke of the pawl is completed, however, the blade 82 engages the valve $V^5$ so as to immediately reverse the pawl to return it to the FIG. 12 position ready for the next bleeding operation of the bleed valve $V^{2-1}$. In the meantime, however, the bleed valve $V^{2-2}$ operates for the second third of a revolution of the index shaft 36 and the valve $V^{2-3}$ takes up the following third of a revolution before the cycle is completed and restarts again by opening of the valve $V^{2-1}$.

Referring to FIG. 14, the plunger 18–1 retracts while the cam 80–1 is in a position (180° rotated from the at-rest position shown in FIG. 12) so at this time the cam is moving but holds the valve $V^{6-1}$ in the position illustrated long enough for the plunger 18–1 to be quickly retracted. As soon as the cam 80–1 leaves the valve $V^{6-1}$, the valve returns to the opposite position for discharging fluid pressure behind the piston 28–1 in the power cylinder 30–1 for the greater part of the revolution of the cam so there is plenty of time for the fluid pressure to act on the plastic product 13 and displace it from the cylinder 14–1 and the cylinder extension 20–1 into the rotary valve 22, 24 depending upon the back pressure through the outlet of the rotary valve 25 as balanced against the pressure of the fluid being used to actuate the piston 28–1.

From the foregoing specification it will be obvious that I have provided a pump in which three displacement plungers backed by compressed air or the like operate in such manner that they constantly displace product because of their successive operations wherein, while one is displacing, a second one is under pressure and thereby ready to displace while a third one is retracted. As the position of the valve rotor 24 changes, the first and second plunger valve ports overlap so that both the first and second plungers are displacing product, thereby minimizing pressure surges during valve change time. At any stopped position of the valve rotor and corresponding direction of plunger travel, one valve port is open to the outlet pipe 25, its plunger is moving forward and both of the other valve ports are closed. However, one of the other plungers is being urged forward but can not move because of its closed valve port. The remaining plunger is retracted and thus in product charging position. The only part of the cycle when two ports are open at the same time is during the short time of valve rotation. During this rotation the port of the plunger that is moving closes and the port of the plunger that is being urged forward but not moving opens. Overlap of the ports occurs only during this rotation time to minimize pressure surging.

A valving arrangement is provided for reciprocating the plungers through the necessary sequence for accomplishing the desired pumping action. The valving arrangement is such that the sequence of operations necessary to perform the pumping action in a continuous manner continues as long as fluid pressure is supplied to the fluid pressure supply line 52. The objects contemplated are thereby attained by the structure disclosed on the drawings and described in the foregoing specification.

Some changes may be made in the construction and arrangement of the parts of my sausage mixture pump without departing from the real spirit and purpose of my invention, and it is my intention to cover by my claims any modified forms of structure or use of mechanical equivalents which may reasonably be included within their scope.

I claim as my invention:

1. In a pump of the character disclosed, a hopper for plastic product, at least three cylinders communicating with said hopper, a product plunger in each cylinder for drawing product from said hopper into said cylinders on retraction of said plungers relative to said cylinders and for displacing product from said cylinders upon forward movement of said plungers relative to said cylinders, product valve means communicating with said cylinders to receive product from each thereof, said product valve means in one position being open to one of said cylinders and closed to the remaining cylinders, being operable to change to open and closed positions with respect to said cylinders in succession and being open to more than one cylinder during change from one position to its next successive position, actuating means for successively effecting retraction of the plunger in a cylinder in relation to which said product valve means is closed while urging forward movement of the plungers in any remaining cylinders, said product valve means comprising a housing, a valve rotor therein, ports communicating said rotor with said cylinders, said first mentioned actuating means comprising indexing means for said valve rotor, said indexing means comprising a ratchet and pawl mechanism, a piston for actuating said pawl, a cylinder for said piston and control valve means for reciprocating said piston.

2. A pump in accordance with claim 1 wherein said last mentioned control valve means is actuated in the idle direction by the stroke of said piston and in the ratchet rotating direction by the successive completion of the strokes of said product plungers in their forward directions.

3. A pump in accordance with claim 1 wherein said control valve means is actuated in the indexing direction as a result of completion of the forward stroke of a plunger and in the return direction by completion of the forward stroke of said indexing means.

4. A pump in accordance with claim 1 wherein fluid pressure operated actuating means is provided for said ratchet and pawl mechanism and valve means is provided for said fluid pressure operated actuating means, said last valve means being actuated in the pawl advancing direction as a result of completion of the forward stroke of a plunger and in the return direction by completion of the forward stroke of said indexing means.

5. A pump in accordance with claim 1 wherein the product intakes from said hopper to said cylinders are located adjacent the rearward ends of the product plunger strokes to produce voids in the cylinders during retraction of said product plungers which production of voids tends to draw the product into the cylinders upon opening of said product intakes.

6. In a product pump, a hopper for plastic product, three cylinders communicating with said hopper for receiving product therefrom, a product plunger in each cylinder for drawing product from said hopper into said cylinders on retraction of said plungers relative to said cylinders and for displacing product from said cylinders upon forward movement of said plungers relative to said cylinders, product valve means communicating with all of said cylinders to receive product from each thereof, said product valve means in one position being open to one of said cylinders and closed to the other two cylinders, being operable to change to open and closed positions with respect to said cylinders in succession and being open to two cylinders during change from one position to the next successive position, actuating means for said product valve means, and actuating means for successively effecting retraction of the plunger in a cylinder in relation to which said product valve means is closed while urging forward movement of the plungers in the two remaining cylinders, said product valve means comprising a housing, a valve rotor therein, ports communicating said rotor with said cylinders, said first mentioned actuating means comprising indexing means for said valve rotor, said indexing means comprising a ratchet and pawl mechanism, a piston for actuating said pawl, a cylinder for said last mentioned piston and control valve means for controlling the reciprocations thereof.

7. A pump in accordance with claim 6 wherein said last mentioned control valve means is actuated in the idle direction by the stroke of said piston and in the ratchet rotating direction by the successive completion of the strokes of said product plungers in their forward directions.

8. A pump in accordance with claim 6 wherein fluid pressure operated actuating means is provided for said ratchet and pawl mechanism and valve means is provided for said fluid pressure operated actuating means, said last valve means being actuated in the pawl advancing direction as a result of completion of the forward stroke of a plunger and in the return direction by completion of the forward stroke of said indexing means, and wherein said actuating means comprises a piston for each product plunger, a power cylinder for each piston, a pressure fluid supply for said cylinders, and control valve means for said power cylinders.

References Cited

UNITED STATES PATENTS

| | | | |
|---|---|---|---|
| 1,097,878 | 5/1914 | Reardon | 230—224 |
| 1,382,336 | 6/1921 | Behr | 103—227 |
| 1,766,610 | 6/1930 | Davis | 103—169 |
| 2,737,817 | 3/1956 | Harris et al. | 103—169 |
| 2,796,032 | 6/1957 | Ballert | 103—153 |
| 2,854,170 | 9/1958 | Borgardt et al. | 103—153 |
| 3,068,806 | 12/1962 | Sherrod | 103—169 |
| 3,198,123 | 8/1965 | Wilkinson et al. | 103—227 |

DONLEY J. STOCKING, *Primary Examiner.*

W. L. FREEH, *Assistant Examiner.*